Figure 1:
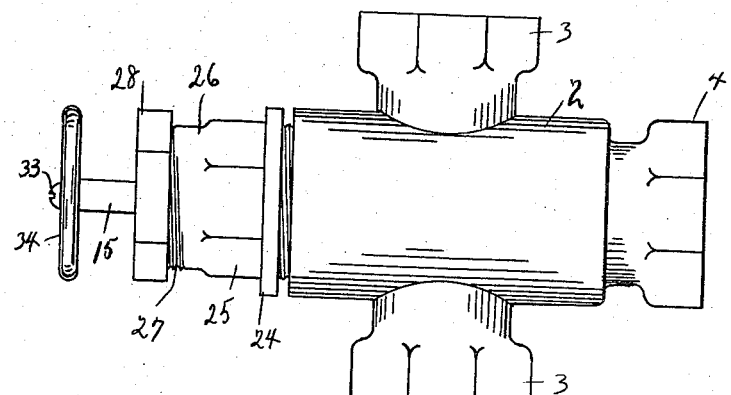

F. J. DITTRICH.
CROSS STOP.
APPLICATION FILED NOV. 29, 1913.

1,178,221.

Patented Apr. 4, 1916.

Witnesses
M. P. Williamson
M. Tobias

Inventor
Ferdinand J. Dittrich
By W. W. Williamson
Attorney

UNITED STATES PATENT OFFICE.

FERDINAND J. DITTRICH, OF PHILADELPHIA, PENNSYLVANIA.

CROSS-STOP.

1,178,221.     Specification of Letters Patent.     Patented Apr. 4, 1916.

Application filed November 29, 1913. Serial No. 803,788.

*To all whom it may concern:*

Be it known that I, FERDINAND J. DITTRICH, a citizen of the United States, residing at Philadelphia, in the county of Philadelphia and State of Pennsylvania, have invented new and useful Improvements in Cross-Stops, of which the following is a specification.

My invention relates to new and useful improvements in cross stops and has for its object to provide a device of this character which may be produced from malleable iron having an inserted brass seat.

A further object of the invention is to provide a stop which will take the place of the joint between the main supply pipe and two branch pipes and one of the ordinary stops now in use, thus saving considerable time and expense in placing them in position as well as a saving of material.

A further object of the invention is to construct a cross stop of malleable iron having an inlet and two outlets, one of said outlet passage ways having a valve seat situated therein with which coöperates a suitable valve, the stem thereof having a longitudinal waste opening therethrough so that when the outlet in which the valve seat is situated is shut off by the valve, the water remaining in the pipe leading from said outlet, may be drained. A device of this character permits the shutting off of the supply of water to one set of pipes without interrupting the service through the other set of pipes, for instance; if the stop is situated between the supply pipe and the branch pipes leading to the kitchen and outside faucets and the outlet leading to the kitchen pipes has the valve seat situated therein then if it is necessary to repair the pipes leading to the kitchen the valve is closed upon its seat thus interrupting the supply to the kitchen, but the supply to the outside faucet will continue. After the supply is shut off from the pipes leading to the kitchen said pipes may be drained by removing the screw from the valve stem and permitting the water to drain therethrough.

Another object of the invention is to provide suitable means for packing the valve stem.

A still further object of the invention is to provide means for straining the water as it passes through the stop.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 2:
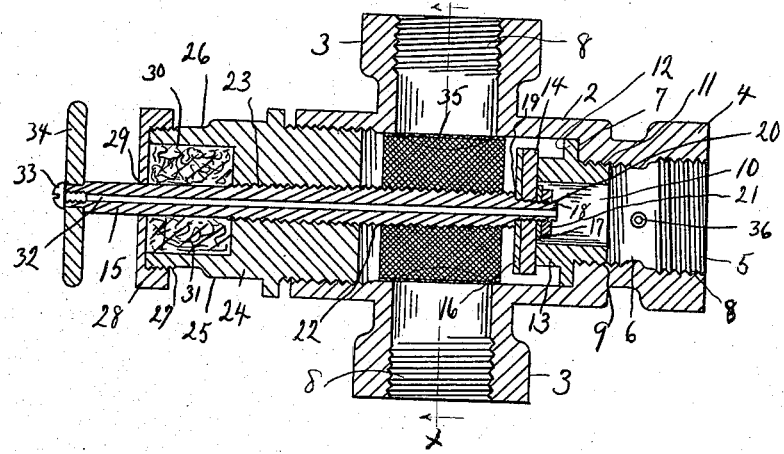
Figure 3:
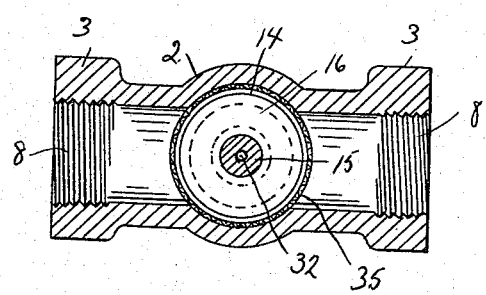

Figure 1, is a side elevation of a cross stop made in accordance with my improvement. Fig. 2, a longitudinal sectional view thereof, and Fig. 3, a section at the line —*x x*— of Fig. 2, looking in the direction of the arrows.

In carrying out my invention as here embodied, 2 represents the body preferably formed of malleable iron having two oppositely disposed arms 3, either of which may be used as the inlet and the other one an outlet, and an outlet 4, said last named outlet having two different sized passage ways 5 and 6, the smaller passage way producing with the interior of the body, a shoulder 7. The inlet and outlets are threaded as at 8 for receiving the ends of the pipe to which the stop is connected, and a similar passage way 6 is threaded as at 9 and adapted to receive the valve seat 10 provided with threads 11, a flange 12 which seats itself upon the shoulder 7 and an annular projection 13 against the inner edge of which coöperates the valve plug 14 preferably in the form of a washer which is mounted upon the valve stem 15 between the washers 16 and 17. These are mounted upon the reduced portion 18 of the valve stem, said reduced portion forming a shoulder 19 against which rests the washer 16. This reduced portion is threaded as at 20 and the valve plug is held in place by a nut 21 threaded on said reduced portion. The larger portion of the valve stem 15 is threaded throughout a portion thereof as at 22 and said stem passes through the central threaded opening 23 in the inclosing plug 24 which is adapted to be threaded into the body opposite the outlet 4. Said inclosing plug is provided with a nut portion 25 and an annular outer end 26 provided with threads 27 on which is threaded a cap 28 provided with an opening 29 for the passage of the valve stem. The inclosing plug is provided at its outer end with a stuffing box 30 adapted to carry a suitable packing 31 which surrounds the unthreaded portion of the valve stem and prevents leakage around said valve stem. The valve stem is provided with an axial longitudinal waste opening 32, the outer end of which is threaded to receive the screw 33 said screw closing the waste opening and also holding the handle 34 in place upon the valve stem.

Within the body of the stop is mounted an annular strainer 35 which snugly fits the interior walls of the body and lies across the passage ways through the arms 3 thus straining the water before it passes into the body thereby preventing foreign matter entering the stop and interfering with the work of the stop.

In practice, the cross stop is situated in a line of pipe between the supply and two branch pipes and when anything is out of order in the branch pipe leading from the outlet 4, the supply through said pipe may be shut off without interfering with the service to the other branch pipe, it will be understood that the last named branch pipe will require a stop of ordinary construction so that said branch pipe may be shut off if it is found that repairs are necessary thereto, but it is to be noted that a second stop is unnecessary so that the device here described takes the place of one stop and the joint or coupling between the supply branch pipes thereby combining two devices so that a saving is had in the first cost of the parts and in the time, labor and expense of placing the same in position.

The body of the cross stop is also provided with a waste opening 36 in the outlet end 4 and is closed in any suitable manner when not in use. This waste opening 36 permits the withdrawal of the waste when a solid valve stem is used or when for any reason it is impracticable to use the outlet through the valve stem.

Of course I do not wish to be limited to the exact details of construction as here shown as these may be varied within the limits of the appended claims without departing from the spirit of my invention.

Having thus fully described my invention, what I claim as new and useful, is—

1. In a cross stop, a body having an inlet and two outlets, one of said outlets being reduced in size, a shoulder produced by the different circumferences of said outlet and the interior of the body, a removable seat mounted in said outlet, an inclosing plug threaded in the body opposite said outlet, said inclosing plug having a longitudinal opening and a stuffing box and packing mounted in said stuffing box, a cap having a central opening threaded on the inclosing plug, a valve stem having a longitudinal opening therein threaded into the inclosing plug and passing therethrough, a valve plug carried by the inner end of said valve stem adapted to coöperate with the valve seat, a handle mounted on the outer end of the valve stem and means for fastening said handle to the valve stem and closing the passage way through said valve stem.

2. In a cross stop, a body having an inlet and two outlets, one of said outlets being reduced in size, a shoulder produced by the different circumferences of said outlet and the interior of the body, a removable seat mounted in said outlet, an inclosing plug threaded in the body opposite said outlet, said inclosing plug having a longitudinal opening and a stuffing box and packing mounted in said stuffing box, a cap having a central opening threaded on the inclosing plug, a valve stem having a longitudinal opening therein threaded into the inclosing plug and passing therethrough, the inner end of said valve stem being reduced in size, and threaded, a washer mounted on said reduced portion, a valve plug also mounted on said reduced portion and lying against the washer, a smaller washer lying against the valve plug, a nut threaded on said reduced portion for holding the washers and valve plug in position, a handle mounted on the outer end of the valve stem, a screw threaded into the longitudinal opening in the valve stem for normally closing said longitudinal opening and hold the handle in place and an annular strainer of foraminous material mounted in the body and disposed across two of the passage ways leading therefrom.

3. A cross stop comprising a body having an inlet and two outlets, a valve seat situated in one of said outlets, an inclosing plug mounted in the body opposite the valve seat, a valve stem passing through said inclosing plug having a longitudinal waste opening passing therethrough from end to end, a valve plug mounted on the inner end of said stem and arranged to engage the valve seat, a handle mounted on the outer end of said valve stem, and a screw threaded into the longitudinal opening in the valve stem for holding the handle in position and normally closing said waste opening with capacity for withdrawal to permit drainage when the valve plug is set, and at desired times.

In testimony whereof, I have hereunto affixed my signature in the presence of two subscribing witnesses.

FERDINAND J. DITTRICH.

Witnesses:
JAMES J. McCANN,
JOHN T. EHINGER.